United States Patent

[11] 3,595,993

[72] Inventor John N. Pratt
Indianapolis, Ind.
[21] Appl. No. 852,853
[22] Filed Aug. 25, 1969
[45] Patented July 27, 1971
[73] Assignee RCA Corporation

[56] References Cited

UNITED STATES PATENTS

| | | | |
|---|---|---|---|
| 3,167,721 | 1/1965 | Broadhead, Jr. | 330/149 |
| 3,236,946 | 2/1966 | Hansen et al. | 178/6 NS |
| 3,483,322 | 12/1969 | Graf | 178/7.5 S |

*Primary Examiner*—Robert L. Griffin
*Assistant Examiner*—Donald E. Stout
*Attorney*—Eugene M Whitacre

[54] NOISE-CANCELLING CIRCUITS
8 Claims, 1 Drawing Fig.

[52] U.S. Cl. 178/5.4 R, 178/7.5 S, 178/7.5 DC, 325/475, 328/165, 330/149
[51] Int. Cl. H04n 9/12
[50] Field of Search 178/6 NS, 7.3 S, 7.5 S, 5.4; 330/149; 328/165; 325/319, 413, 414, 475

ABSTRACT: A noise canceller employs a transistor having an emitter electrode direct coupled to a source of composite signals and a collector electrode coupled to the input electrode of a sync amplifier. The base electrode as biased from a reference voltage divider causes the transistor to conduct for noise pulses above sync tips. The conduction of the transistor tends to cut off the sync amplifier, while further serving to load the composite signal source and thereby reduce the magnitude of noise pulses applied to an AGC circuit also coupled to said source.

PATENTED JUL 27 1971 3,595,993
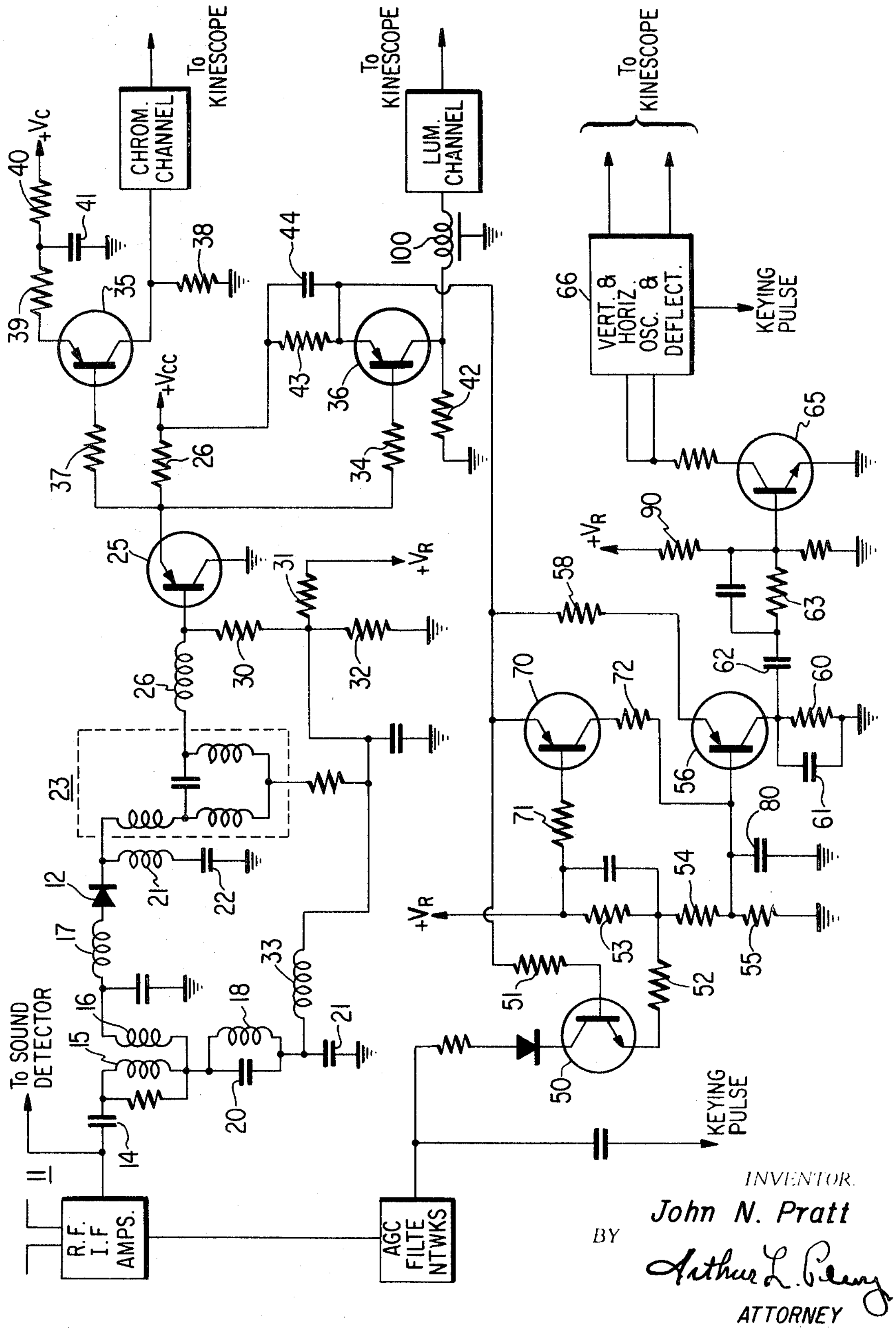
INVENTOR.
John N. Pratt
BY
Arthur L. Pleny
ATTORNEY

NOISE-CANCELLING CIRCUITS

This invention relates to television receivers and more particularly to a noise-cancelling circuit for use in such a receiver.

Presently, noise inverters, cancellers and so on are known and used in the prior art to cancel noise pulses which otherwise might interfere with and disturb the operation of the sync separator circuits of the receiver.

Prior art noise-cancelling circuits use active devices as transistors, tubes and so which are AC coupled to the video source and are responsive to noise pulses which exceed the sync level. Such circuits require large coupling capacitors or extra devices to set up the noise threshold level and many prior art circuits require potentiometers and variable controls to properly adjust circuit operation.

It is also desirable to provide noise immunity when possible for the automatic gain control circuit. Prior art circuits do so provide at the expense of additional components and circuits. This provision serves to increase the cost of the noise-cancelling cancelling circuit in combination with the sync and AGC networks.

It is therefore an object of the present invention to provide an improved noise-cancelling circuit.

A further object is to provide a noise-cancelling circuit requiring no variable impedance controls while utilizing direct coupling to a video signal source.

A further object is to provide a noise-cancelling circuit capable of cancelling noise pulses to both the AGC and sync circuits of a television receiver.

These and other objects are accomplished by direct coupling the input electrode of a noise-cancelling transistor to the output electrode of a video amplifier. The video amplifier output electrode is further direct coupled to the input of a sync and AGC circuit. The circuits are all biased with respect to a given potential level, so that the noise canceller conducts above a predetermined sync tip reference level. The collector of the noise canceller transistor is direct coupled to the input of the sync circuit and conduction of the transistor tends to cut off the sync amplifier. The transistor when conducting further serves to load the video amplifier thus reducing the magnitude of the pulse as applied to the AGC circuit driven from the same video amplifier.

These and other objects of the present invention will become clearer if reference is had to the following specification taken in conjunction with the sole FIGURE, which is a schematic diagram partially in block form of a television receiver incorporating a noise canceller circuit according to an embodiment of the present invention.

The FIGURE illustrates the usual head end structure of a television receiver including the RF amplifier converter and IF amplifier designated generally by the block 11. Conventionally the output of the final IF state is coupled to a sound detector, not shown, and to the pix or video detector represented in part by diode 12. Coupling between the IF stage and the video detector includes the capacitor 14 which is coupled to the anode of the diode 12 through the series inductances 15, 16, and 17. The inductances including the trap, represented by inductor 18 in parallel with capacitor 20 and AC coupled to ground via capacitor 21, are provided to discriminate against harmonics and to further discriminate against intercarrier beat which would otherwise interfere with the detected video signal and provide consequent disturbances on the face of the kinescope display. Such filtering techniques and functions of the various components associated with the detector are well known in the prior art and not considered to be part of this invention.

Basically the output of the video detector, as represented by the cathode of the video detector diode 12, provides a detected composite signal across the series combination of inductor 21 and capacitor 22 connected between the cathode of the detector diode 12 and a point of reference potential such as ground. The cathode of the diode 12 is coupled through a filter network generally designated by numeral 23 which aides in preventing the 4.5 MHz. demodulated product representative of the sound carrier, from appearing at the input or base electrode of an emitter-follower transistor 25. Transistor 25 offers a high input impedance to the video detector to avoid loading of the detector and loading of the relatively high Q-filter networks coupled to the output of the detector. The emitter follower 25 serves to isolate the capacitive reactances of the luminance and/or chrominance channels which capacitance effects might otherwise cause oscillations. The use of an emitter-follower configuration, as shown, for transistor 25 further provides power gain and a low output impedance in order to optimumly drive the succeeding chrominance and luminance amplifiers coupled to the emitter electrode thereof. Furthermore, because of the impedance transfer offered by the emitter follower, the loading on the IF amplifier is predominantly determined by resistor 30. The emitter of transistor 25 is coupled to a point of reference potential labeled as $+V_{cc}$ via the resistor 26. The collector of transistor 25 is coupled to the point of reference potential.

The base electrode of transistor 25 is coupled to the output of the video detector and the subsequent filtering network via the inductor 26. A biasing network for the base electrode of transistor 25 is derived via a voltage divider including resistors 30, 31, and 32. Resistors 30 and 31 are connected in series between the base electrode of transistor 25 and a reference voltage source designated as $+V_R$. A prebias also provided for the detector circuit emanating from the same $+V_R$ reference supply via resistor 31, and resistor 32. Resistor 32 is coupled between the junction of resistors 30 and 31 and the point of reference potential. The diode 12 is biased at approximately zero volts by coupling the junction between resistors 31 and 32 to the cathode of the video detector diode 12 via the DC resistance of inductor 33. The DC path is thus provided through inductor 33, through inductor 18 and thence through inductors 16 and 17 to the anode of diode 12.

In this manner, the video detector as biased enables linearity in the operation of the diode device 12 and further improves the peak-to-peak output signal capable of being provided at the cathode of the video detector diode 12. For the absence of the video signal the base electrode of transistor 25 has a positive bias thereon as does the anode electrode of the video detector 12. The voltage divider so provided by the resistors 31 and 32 maintains transistor 25 at a positive bias and hence the output of the video detector at a positive bias. The input of the video detector or anode electrode of diode 12 is at approximately the same or a slightly less positive bias thereby rendering the diode 12 at a zero or slightly forward biased for the absence of video signals. Transistor 25, as biased by the voltage divider from the $+V_R$ reference source has a more positive voltage on the emitter electrode thereof, which differs from the voltage on the base by the normal $V_{BE}$ drop or by the normal voltage drop from base to emitter of the transistor 25. The emitter electrode of transistor 25 is respectively coupled to a chrominance amplifier transistor 35 and a luminance amplifier transistor 36 via the individual base isolating resistor 37 and 34 coupled between the emitter electrode of transistor 25 and the respective base electrodes 35 and 36. The collector electrode of the PNP transistor 35 is coupled to ground through a load resistor 38. The emitter electrode of transistor 35 is coupled to a source of operating potential $+V_c$ via resistors 39 and 40 connected between the emitter electrode of transistor 35 and the operating bias source. A capacitor 41 is coupled between the junction of resistors 39 and 40 to provide bypassing of the emitter resistance 40 for chrominance signals. The amplifier including transistor 35 is arranged in a common emitter configuration and has the collector electrode coupled to the chrominance channel for amplification and separation of the chrominance subcarrier signals from the composite video signal.

The amplifier configuration shown is particularly advantageous as a composite signal amplifier used in the chrominance channel of a color receiver for reasons as follows: Desirably, the signal in the chrominance channel should be relatively free of the lower frequency luminance components in order to perform proper chrominance demodulation and processing.

In the amplifier shown, the magnitude of the series emitter resistors 39 and 40 are selected to be larger than the magnitude of the collector resistor 38. In order to obtain a relatively large voltage swing at the collector, the $+V_C$ source is selected to be much larger, for example, then the $+V_{cc}$ supply. In a typical example, the resistor 39 is 33 ohms, the resistor 40 is 33,000 ohms, while the collector resistor 38 is 4,700 ohms. Capacitor 41 is selected to exhibit a relatively low reactance towards the high frequency end of the composite signal range.

In this manner, the DC gain of amplifier 35 is low due to the selection of the collector and emitter impedances as is the relative AC luminance signal gain at the collector electrode of transistor 35. Due to the addition of the large emitter impedance in combination with the base resistor 37, transistor 35 operates at a relatively constant current drive. Furthermore, transistor 35 may be a relatively low-voltage-rated device even though the $+V_c$ supply may exceed 100 volts. This is so as the transistor 35 is always conducting due to the biasing thereof and will always exhibit a low voltage drop between collector and emitter due to the magnitude of resistors 39 and 40.

Accordingly, the chrominance amplifier, serves to provide a high AC gain for chrominance signals, while providing a low gain to luminance signals. The transistor 35 further serves to isolate the chrominance channel and the associated controls from the luminance channel and hence chrominance signal processing or chrominance control variations will not disturb the phase or amplitude of the luminance channel signal by reflecting back into the luminance signal path considerable impedance charges.

The addition of resistor 39 which is smaller in magnitude than resistor 40 serves to provide current feedback for the chrominance amplifier and serves to effectively isolate capacitor 41 from reflecting back its capacitive reactance to the base electrode of the transistor amplifier 35 which reactance might otherwise upset the operation of the emitter follower 25 as terminating the video detector.

The luminance amplifier transistor 36 is also arranged in a common emitter amplifier configuration and has a collector load comprising resistor 42 coupled between the collector electrode of transistor 36 and a point of reference potential. Resistor 36 is selected to terminate the delay line 100 while further serving to permit voltage gain to be provided for the luminance channel. An emitter bias is provided for transistor 36 via resistor 43 coupled between the emitter electrode and $+V_{cc}$ supply. Resistor 43 is bypassed for high frequency operation by capacitor 44. The collector electrode of the transistor is direct coupled to the subsequent delay line 100, and subsequent luminance amplifiers, forming the luminance channel of a typical color television receiver.

In summation, the above-described low level video circuitry has the following advantages.

The emitter follower 25 serves to effectively isolate the video detector and associated filter networks from the luminance and chrominance stages. Such stages are further isolated from each other by means of their own common emitter amplifiers represented in part by transistors 35 and 36. As is known, certain controls for providing optimum display are provided for in the luminance amplifier channel which conventionally includes a brightness and a contrast control. By so isolating the luminance channel as described above these controls do not affect the operating conditions of the chrominance channel.

In a similar manner, the chrominance channel is designed to provide color hue and color saturation controls, while further being disabled during the burst period by means of the horizontal blanking pulse provided thereto. In this manner, one may operate on the chrominance channel controls without reflecting any spurious signals back to the video detector or luminance amplifier and therefore prevent interference with the normal operation of the luminance channel because of the subsequent isolation provided by the chrominance amplifier including transistor 35.

Another advantageous feature of the amplifier configuration thus described is the isolation of the luminance channel amplifiers and associated controls from the sync, AGC and noise-cancelling circuitry. From the figure it can be seen that such circuits normally found in a conventional receiver are driven from the emitter of transistor 36 which provides a low impedance drive source for these circuits. The capacitor 44, as coupled in shunt with the emitter load of transistor 36, further serves to peak the collector signal for the drive applied to the base electrode and aids in limiting noise pulses which would interfere with the operation of the sync and AGC circuits coupled to the emitter electrode. The emitter electrode of transistor 36 is directly coupled to the base electrode of an AGC transistor 50 via a resistor 51. The AGC transistor 50 is an NPN device and has its emitter electrode coupled to a point on a voltage divider via a resistor 52. The voltage divider comprises the series combination of resistors 53, 54, and 55 coupled between the $+V_R$ or aforementioned reference voltage supply, and the point of reference potential. The reason for doing this will be described in greater detail subsequently.

The emitter electrode of transistor 50 is therefore coupled between the junction between resistors 53 and 54, included in the above-mentioned divider by means of resistor 52. In a similar manner, a sync separator preamplifier transistor 56 has the base electrode thereof coupled between the junction of resistors 54 and 55 included in the above-mentioned divider. The emitter electrode of the sync preamplifier transistor 56 is coupled to the emitter electrode of the transistor 36 via resistor 58. The sync preamplifier stage is arranged in a common base configuration and has the collector electrode coupled to a point of reference potential via a resistor 60 which is bypassed for frequency compensation by means of a capacitor 61. Capacitor 61 lowers the band-pass of the amplifier 58 for noise and chrominance signals which would otherwise interfere with the sync separation process. The collector electrode output of transistor 56 is AC coupled via a capacitor 62 in series with a resistor 63 to the base electrode of a sync separator transistor amplifier 65. Transistor 65 is arranged in a common emitter configuration and has a collector load coupled to the vertical and horizontal deflection circuits shown generally as module 66. Also direct coupled to the emitter electrode of the luminance driver amplifier transistor 36 is the emitter electrode of a transistor 70 used as a noise canceller and arranged in a common base configuration. Transistor 70 also has its base electrode biased from the $+V_R$ supply by means of resistor 71. The collector electrode of transistor 70 is coupled to the base electrode of the sync separator transistor by means of a resistor 72.

Before explaining the mode of operation of the above described circuitry, a few brief points will be noted. Namely it is noted that the video detector including the emitter follower comprising in part transistor 25 are referenced from the $+V_R$ reference supply. The sync preamplifier including transistor 56, the noise canceller including transistor 70, and the AGC keyer including transistor 50 are all DC coupled to the output electrode or emitter electrode of luminance amplifier transistor 36; which in turn is DC coupled to the emitter electrode of the emitter follower including transistor 25.

In a similar manner, the base electrode of all the above noted transistors are referenced from the $+V_R$ supply or the above noted reference voltage supply. The AGC transistor 50 is an NPN because of the AGC voltage polarity to be used to control the gain of the RF and IF amplifiers. A positive keying pulse is typically available at the horizontal deflection transformer and an NPN transistor as shown, when keyed by a position pulse will provide a negative DC level across a suitable capacitor for AGC voltage. This is also preferable as the keying pulse which is normally applied to the collector electrode is of a relatively large amplitude and due to present commercial practices it is more economical to purchase an NPN transistor capable of handling the relatively large keying pulse which is applied thereto from the horizontal deflection circuits 66 of the receiver. Thus an NPN transistor 50 is used for the AGC circuit. Consideration is now given to the transistor types to be utilized for the relatively low level video stages and chrominance stages together with the signal processing circuitry included. It is noted that transistors 25, 35, 36, 70 and 56 are all PNP devices which are selected to be the same transistor type. The inclusion of the five transistors in the low level video processing portion of the receiver allows the manufacturer to purchase relatively large numbers of these inexpensive PNP devices while obtaining optimum performance in the receiver by utilizing the shown circuit configuration, described briefly above and which will be described in greater detail subsequently.

In circuit operation, from a DC point of view, the emitter electrode of the AGC transistor 50 is approximately biased at 0.8 of a volt or one $V_{BE}$ below the reference voltage $+V_R$. The biasing of the video detector from the $+V_R$ voltage source via resistors 31 and 32 causes the voltage at the emitter electrode of transistor 25 to be approximately one $V_{BE}$ above the voltage on the base electrode of transistor 25. The voltage at the emitter electrode of transistor 36 is again one $V_{BE}$ above the voltage at the emitter electrode of transistor 25, or 2 $V_{BE}$ above the voltage at the base electrode of transistor 25. Due to the fact that the AGC transistor 50 is an NPN device, the voltage from base to emitter is one $V_{BE}$ in the opposite direction from PNP device.

The emitter electrode of transistor 50, as indicated, is approximately one $V_{BE}$ below the $+V_R$ supply or 0.8 volts (for NPN below the $+V_R$ supply. The AGC transistor 50 as biased should conduct when keyed by the pulse coupled to the collector, during the sync tip portion of the composite signal. Hence, the difference between the DC voltage at the base electrode of transistor 25 with respect to the DC conduction point of transistor 50 determines the peak-to-peak video swing at the video detector. This level is accurately set forth and is determined by the magnitude of the $+V_R$ supply and the reference voltage dividers, together with the $V_{BE}$ drops of the associated transistors.

Transistor 70, as biased, will conduct during noise pulses which are approximately 0.8 volts above the sync tip level. The conduction of transistor 70 causes the collector electrode to go more positive thus attempting to cut off transistor 56 or decrease the conduction to thereby effectively cancel the noise pulse at the collector electrode thereof. This action serves to render the sync circuits relatively noise immune as noise pulses are cancelled due to the conduction and biasing of transistor 70.

The noise canceller, thus shown, is completely DC coupled to the sync amplifier transistor 56 and to the video amplifier transistor 36 thus requiring no coupling capacitors or additional diode devices as normally found in the prior art. Resistor 71 in series with base is effectively divided by the beta of transistor 70 and introduces a low impedance seen at the emitter electrode of transistor 36 when transistor 70 conducts. Thus when transistor 70 conducts the resistor 71 as transformed loads the noise pulses above sync tip as applied to the AGC transistor 50.

Capacitor 80 in shunt with resistor 55 at the base electrode of transistor 56 serves the bypass the base for common base operation.

The sync preamplifier transistor 56 as biased is active during the entire video signal as the emitter electrode is more positive than the base electrode to to the biasing thereof from the $+V_R$ supply. Sync separation is performed by transistor 65 which is normally conducting due to resistor 90 coupled between the R $V_R$ supply L and the base electrode. When horizontal sync appears at the base via capacitor 62 which is selected to be relatively large this serves to cause increased conduction in transistor 65 thus producing a negative sync pulse at the collector. During the video portion, transistor 65 is driven towards cutoff. A similar operation occurs for the vertical pulses.

The base electrode of the PNP noise canceller transistor 70 is slightly more positive than the emitter electrode of the NPN, AGC transistor 50. Transistor 70 will therefore conduct slightly above the point of conduction of the AGC transistor 50 and therefore, slightly above the DC level representative of sync tip. Since the AGC transistor 50 can conduct during the keying pulse which is developed during the horizontal, a horizontal pulse would appear at the base of the sync amplifier transistor 56 thus disturbing the operation.

If capacitor 80 were too large in magnitude, it would also serve to bypass noise pulses and hence the magnitude of capacitor 80 is selected to provide a compromise to bypass the relatively narrower horizontal pulses without deteriorating the noise-cancelling pulses. To further aid in noise cancellation, transistor amplifier 70 provides voltage gain for the noise pulses by proper selection of resistor 72 in relation to impedance seen looking into the junction between resistors 54 and 55.

Thus, the noise canceller being completely DC coupled can also provide gain without signal inversion.

The biasing of the noise canceller from the reference source $+V_R$ assures conduction for noise pulses above sync tip due to the biasing of the video detector and subsequent amplifier configurations from the common reference supply $+V_R$ as described above.

Video processing circuitry, as described, performed accordingly, in an embodiment, which included the following components, by way of example:

| | | |
|---|---|---|
| Resistors | 26 | 2,200 ohms |
| | 30 | 5,600 ohms |
| | 31 | 2,700 ohms |
| | 32 | 10,000 ohms |
| | 34 | 1,000 ohms |
| | 37 | 680 ohms |
| | 38 | 4,700 ohms |
| | 39 | 33 ohms |
| | 40 | 33,000 ohms |
| | 42 | 680 ohms |
| | 48 | 270 ohms |
| | 51 | 1,000 ohms |
| | 52 | 100 ohms |
| | 53 | 560 ohms |
| | 43 | 270 ohms |
| | 54 | 1,000 ohms |
| | 55 | 10,000 ohms |
| | 58 | 330 ohms |
| | 63 | 1,800 ohms |
| | 71 | 1,000 ohms |
| | 72 | 1,500 ohms |
| Capacitors | 41 | 1,000 micromicrofarads |
| | 44 | 1,000 micromicrofarads |
| | 61 | 470 micromicrofarads |
| | 62 | 0.22 microfarads |
| | 80 | 0.047 microfarads |
| Transistors | 50 | NPN 2N3440 |
| | 65 | NPN 2N3565 |
| | 25 | PNP 2N4248 or equivalents |
| | 35 | PNP 2N4248 or equivalents |
| | 36 | PNP 2N4248 or equivalents |
| | 56 | PNP 2N4248 or equivalents |
| | 70 | PNP 2N4248 or equivalents |
| | $+V_R$ | +18 volts |
| | $+V_c$ | +130 volts |
| | $+V_{cc}$ | +22 volts |

What I claim is:

1. In a television receiver having a source of composite television signals including image brightness representative signal components and regularly recurring synchronizing signal components extending in amplitude beyond said image brightness representative signal components, the combination comprising, a. automatic gain control means including a transistor of a given conductivity arranged in a common emitter configuration and having an output collector electrode coupled to said source of composite signals for maintaining said synchronizing signals levels at a substantially fixed level, b. noise threshold means including a transistor amplifier of an opposite conductivity with respect to said given conductivity, and having a collector electrode, and an emitter electrode direct coupled to said composite television signal source, said transistor responsive to noise components exceeding said fixed level by a predetermined amount, c. a first voltage source, d. means coupled to said first voltage source for supplying a first fixed reference potential to said source of composite television signals and for supplying a second fixed reference voltage to said automatic gain control transistor and to said noise threshold transistor for establishing said fixed level, e. a synchronizing amplifier including a transistor of an opposite conductivity to said given conductivity having a base electrode coupled to said first voltage source for supplying a third reference level thereto, and an emitter electrode direct coupled to said composite television signal source, and f. means direct coupling said collector electrode of said noise threshold amplifier to said base electrode of said synchronizing transistor amplifier to cancel noise pulses which exceed said predetermined magnitude, according to said differences in said reference voltage levels.

2. The combination according to claim 1, wherein said noise threshold transistor and said synchronizing amplifier transistors are arranged in common base configuration.

3. In a television receiver having a source of composite television signals including image brightness signal components and regularly recurring synchronizing signal components extending in amplitude beyond said image brightness signal components, said receiver including an amplifier having an input terminal coupled to said source of composite signals and an output terminal, the combination therewith, a. automatic gain control means including a transistor of a given conductivity arranged in a common emitter configuration, and having an emitter electrode, and a base electrode thereof directly coupled to said output terminal of said amplifier and having a collector output electrode coupled to said source of composite television signals for maintaining said synchronizing signal levels at a substantially fixed level, b. a noise canceller circuit including a transistor amplifier of an opposite conductivity with respect to said given conductivity, arranged in a common base configuration and having an emitter electrode direct coupled to said output terminal of said amplifier, and a base and collector electrode, c. a first voltage source, d. means coupled to said first voltage source for supplying to said base electrode of said noise canceller circuit transistor and said emitter electrode of said automatic gain control transistor a first reference potential and for supplying a second reference potential to said source of composite signals, the difference between said first and second potentials determinative of the peak amplitude of said composite signals, e. a synchronizing amplifier including a transistor of opposite conductivity to said given conductivity having a base electrode coupled to said first voltage source for supplying an operating potential thereto and an emitter electrode coupled to said output terminal of said amplifier, and f. means direct coupling said collector electrode of said noise canceller transistor to the base electrode of said synchronizing amplifier transistor to cancel noise pulses which exceed said predetermined magnitude, according to said difference in reference potentials, said conduction of said noise canceller transistor serving to load said amplifier at said output terminal to reduce the magnitude of noise pulses as applied to said base electrode of said automatic gain control transistor.

4. In a television receiver having a source of composite signals including image brightness representative signal components and regularly recurring synchronizing signal components extending in amplitude beyond said image brightness components, said receiver including a luminance amplifier having an input terminal direct coupled to said source and an output terminal direct coupled to an input terminal of an automatic gain control circuit for maintaining said synchronizing signal components at a substantially fixed level, in combination therewith, apparatus for cancelling noise pulses which exceed said fixed level comprising, a. a first transistor having a base, collector and emitter electrode direct coupled to said output terminal of said luminance amplifier, b. means coupled to the collector electrode of said first transistor and responsive to said synchronizing components to provide at an output an amplifier version thereof, c. a second transistor having a base, emitter and collector electrode, having the emitter electrode direct coupled to said output terminal of said luminance amplifier and said collector electrode direct coupled to said base electrode of said first transistor, d. a voltage source, e. means for coupling said base electrode of said first transistor to said voltage source, and f. means including a first resistor coupling said base electrode of said second transistor to said voltage source to bias said second transistor to cause said second transistor to conduct for signal levels above said fixed level, to provide at said collector electrode signals in a direction to cut off said first transistor, said conduction of said second transistor further serving to load said luminance amplifier to decrease any signals during said conduction at said input terminal of said automatic gain control circuit.

5. The apparatus according to claim 4 wherein said first and second transistors are the same conductivity types.

6. The apparatus according to claim 4 further comprising, a. means coupling said voltage source to said source of composite signals for supplying a first fixed reference potential thereto of a magnitude less than said fixed level.

7. The apparatus according to claim 4 further comprising, a. a capacitor coupled between said base electrode of said first transistor and a point of reference potential and selected to provide a relatively low reactance at the synchronizing signal component frequency.

8. In a color television receiver employing RF and IF amplifiers for responding to a transmitted television carrier signal and providing an IF signal output therefrom, said receiver including a video detector having an input coupled to an output of said IF amplifier for providing at an output of said video detector thereof a composite video signal, said receiver including a luminance channel and a chrominance channel for respectively driving a color kinescope included in said receivers for providing a color display, in combination therewith, apparatus for providing low level video signal processing, comprising, a. a first transistor of a given conductivity type arranged in an emitter follower configuration and having the base electrode thereof direct coupled to said output of said video detector, b. a source of operating potential having a relatively constant DC amplitude, c. means for coupling said source of operating potential to said base electrode of said first transistor to provide a DC operating potential thereto, d. second and third transistors of the same given conductivity types as said first transistor, each arranged in a common emitter configuration and having the base electrodes thereof direct coupled to the emitter electrode of said first transistor, e. means coupling the collector electrode of said second transistor to said chrominance channel,
f. means coupling the collector electrode of said third transistor to said luminance channel,
g. fourth and fifth transistors of the same conductivity types as said first transistor having the emitter electrodes coupled directly to the emitter electrode of said third transistor,
h. a voltage divider coupling said base electrodes of said fourth and fifth transistors to said source of operating potential to bias said fifth transistor in a more forward direction in relation to saturation with respect to the bias of said fourth transistor,
i. means coupling the collector electrode of said fourth transistor to the base electrode of said fifth transistor,
j. a sixth transistor of an opposite conductivity with respect to that of said first transistor and having an emitter electrode coupled to said voltage divider between said base electrodes of said fourth and fifth transistors having a base electrode direct coupled to said emitter electrode of said third transistor, said collector electrode of said sixth transistor being coupled to said RF and IF amplifier for controlling the gain thereof and therefore controlling the amplitude of said composite video signal in accordance with the conduction of said sixth transistor, which as biased conducts when said composite video signal exceeds a predetermined DC level at said base electrode of said first transistor as biased from said source of operating potential, said fourth transistor as biased from said divider being responsive to signal levels at said emitter electrode which exceeds the signal necessary to cause conduction of said sixth transistor to cancel all such signals at said base electrode of said fifth transistor, said fourth transistor when conducting further serving to load said emitter electrode of said third transistor to reduce said excessive signal levels as applied to said base electrode of said sixth transistor.